(12) United States Patent
Zhang et al.

(10) Patent No.: US 10,991,072 B2
(45) Date of Patent: Apr. 27, 2021

(54) METHOD AND DEVICE FOR FUSING PANORAMIC VIDEO IMAGES

(71) Applicant: Hangzhou Hikvision Digital Technology Co., Ltd., Hangzhou (CN)

(72) Inventors: Xin Zhang, Hangzhou (CN); Yaodong Lin, Hangzhou (CN); Jie Chen, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 16/469,747

(22) PCT Filed: Oct. 27, 2017

(86) PCT No.: PCT/CN2017/107988
§ 371 (c)(1),
(2) Date: Jun. 14, 2019

(87) PCT Pub. No.: WO2018/107910
PCT Pub. Date: Jun. 21, 2018

(65) Prior Publication Data
US 2020/0090303 A1 Mar. 19, 2020

(30) Foreign Application Priority Data
Dec. 16, 2016 (CN) .......................... 201611176064.2

(51) Int. Cl.
*G06T 3/40* (2006.01)
*G06T 7/215* (2017.01)
*G06T 5/50* (2006.01)

(52) U.S. Cl.
CPC .............. *G06T 3/4038* (2013.01); *G06T 5/50* (2013.01); *G06T 7/215* (2017.01); *G06T 2207/20221* (2013.01)

(58) Field of Classification Search
CPC ......... G06T 3/4038; G06T 5/50; G06T 7/215; G06T 2207/20221; G06T 7/194;
(Continued)

(56) References Cited

U.S. PATENT DOCUMENTS

2004/0086270 A1* 5/2004 Artonne ................. G02B 15/10
396/322
2012/0086727 A1* 4/2012 Korah ....................... G06F 3/03
345/633
(Continued)

FOREIGN PATENT DOCUMENTS

CN 101146231 A 3/2008
CN 101577795 A 11/2009
(Continued)

OTHER PUBLICATIONS

Xiong Y. "Eliminating Ghosting Artifacts for Panoramic Images", 2009 11th IEEE International Symposium on Multimedia (Year: 2009).*
(Continued)

*Primary Examiner* — Richard A Hansell, Jr.
(74) *Attorney, Agent, or Firm* — Clements Bernard Walker; Lawrence A. Baratta, Jr.

(57) ABSTRACT

Provided are a method and apparatus for fusion of a panoramic video to solve a problem that a panoramic video image formed by stitching is incomplete. The method includes: acquiring a panoramic video image (21); extracting a moving target from at least two cuboid three-dimensional images (22); performing image fusion processing on the panoramic video image and the moving target to form a panoramic video image incorporated with the moving target (23). Thereby, problems such as overlapping and disappearance of a moving target, in whole or in part, in a panoramic video image generated by adopting a cuboid three-dimensional model are solved, thereby ensuring the completeness (Continued)

Acquiring a panoramic video image ~ 21

Extracting a moving target from at least two cuboid three-dimensional images ~ 22

Performing image fusion processing on the panoramic video image and the moving target to form a panoramic video image incorporated with the moving target ~ 23 of a panoramic video image and improving the quality of the panoramic video image.

11 Claims, 6 Drawing Sheets

(58) Field of Classification Search
CPC ... G06T 11/00; G06T 3/40; G06T 3/00; G06T 3/0068; G06T 3/0012
See application file for complete search history.

(56) References Cited

U.S. PATENT DOCUMENTS

| | | | |
|---|---|---|---|
| 2012/0293610 A1 | 11/2012 | Doepke et al. | |
| 2014/0362173 A1* | 12/2014 | Doepke | H04N 5/23238 348/36 |
| 2015/0248590 A1* | 9/2015 | Li | G06T 7/194 382/103 |
| 2016/0063705 A1* | 3/2016 | Xu | H04N 5/23238 382/199 |
| 2016/0307350 A1* | 10/2016 | Huang | G06K 9/4671 |
| 2017/0126968 A1* | 5/2017 | Somanath | G06T 3/4038 |
| 2017/0243384 A1* | 8/2017 | Huang | G06T 3/0093 |
| 2017/0366808 A1* | 12/2017 | Lin | H04N 5/23238 |
| 2018/0139431 A1* | 5/2018 | Simek | H04N 5/2258 |

FOREIGN PATENT DOCUMENTS

| | | | |
|---|---|---|---|
| CN | 102426705 A | * | 4/2012 |
| CN | 102426705 A | | 4/2012 |
| CN | 104639911 A | | 5/2015 |
| CN | 105046649 A | * | 11/2015 |

OTHER PUBLICATIONS

International Search Report for International Application No. PCT/CN2017/107988 dated Feb. 1, 2018.
Xiaowu Chen et al.: "Video motion stitching using trajectory and position similarities", Science China Information Sciences, SP Science China Press, Heidelberg, vol. 55, No. 3, Feb. 25, 2012, pp. 600-614, XP035020391, ISSN: 1869-1919, DOI: 10.1007/S11432-011-4534-Y.
Phillip Jenke et al.: "Statistical Reconstruction of Indoor Scenes", WSCG '2009: Full Papers Proceedings: The 17th International Conference in Central Europe on Computer Graphics, Visualization and Computer Vision, Feb. 2, 2009, pp. 17-24, XP055634702, ISBN:978-80-86-94393-0.
Yinda Zhang et al.: "PanoContext: A Whole-Room 3D Context Model for Panoramic Scene Understanding" In: "Distributed Computing: 19th International Conference, DISC 2005, Cracow, Poland, Sep. 26-29, 2005. Proceedings", Jan. 1, 2014, Springer Berlin Heidelberg, Berlin, Heidelberg, XP055634343, ISSN: 0302-9743, ISBN: 978-3-319-11202-2, vol. 8694, pp. 668-686, DOI:10.1007/978-3-319-10599-4_43.
Chenhong Yuan, Dissertation for the Master Degree of Engineering, The Research and Implementation of Fast Panoramic Video Construction and Deghosting, Harbin Institute of Technology, Shenzhen Graduate School, Dec. 2013.

* cited by examiner

METHOD AND DEVICE FOR FUSING PANORAMIC VIDEO IMAGES

The present application claims the priority to a Chinese patent application No. 201611176064.2, filed with the China National Intellectual Property Administration on Dec. 16, 2016 and entitled "Method and device for fusing panoramic video images", which is incorporated herein by reference in its entirety.

TECHNICAL FIELD

The present application relates to the field of image processing technology, in particular to a method and apparatus for fusion of a panoramic video.

BACKGROUND

With the rapid development of image processing technology, panoramic video is more and more applied in various fields. A panoramic video image of a preset scene is formed by capturing video images of the preset scene from different angles with cameras, and then stitching the captured video images. Panoramic video images allows a viewer to easily browse the preset scene from all angles through one video image.

When stitching a plurality of video images to generate a panoramic video image, the plurality of video images are first converted into a plurality of cuboid three-dimensional images by using a cuboid three-dimensional model. When stitching these cuboid three-dimensional images, a stitching surface of an adjacent cuboid three-dimensional image would be cut off, and thus images on the stitching surface would also be cut off. In this case, in the panoramic video image after fusing, an image of a moving target moving to the stitching surface is cut off, which leads to a disappearance of the moving target when it passes through a stitching position or reaches a vicinity of the stitching position.

Specifically, referring to FIG. 1, a simple schematic diagram is shown in which a moving target is displayed abnormally in the related art. In FIG. 1, a human figure having a certain height is simply shown as a moving target, and the moving target is walking in a preset scene from left to right (the preset scene includes two local spaces where a fisheye camera 1 and a fisheye camera 2 are respectively located). When the moving target moves to point A, the fisheye camera 1 and the fisheye camera 2 respectively collect corresponding video images, and dotted lines indicate boundaries of line of sight for capturing the moving target from the position of respective fisheye cameras. At this time, it may be seen from further analysis that in the line of sight of fisheye camera 1, a projection of the moving target is located on a floor, as indicated by a bold black line in the figure; in the line of sight of fisheye camera 2, the projection of the moving target is located on a stitching wall, as indicated by a bold black line in the figure. When the moving target moves to point B, in the line of sight of fisheye camera 1, a part of the projection of the moving target is located on the floor, and a part thereof is located at the stitching position, as indicated by a bold black line in the figure; in the line of sight of fisheye camera 2, the projection of the moving target is located at the stitching position, as indicated by a bold black line in the figure. It can be seen that when video images of two local spaces are stitched, video images at the stitching position would be cut off, thereby causing disappearance of the moving target at the preset stitching area, so that the generated panoramic video image is incomplete.

SUMMARY

An embodiment of the present application provides a method for fusion of a panoramic video, which can solve a problem that a panoramic video image formed by stitching is incomplete.

An embodiment of the present application provides an apparatus for fusion of a panoramic video, which can solve a problem that a panoramic video image formed by stitching is incomplete.

Technical solutions of the embodiments of the present application are as followings.

A method for fusion of a panoramic video, includes:

acquiring a panoramic video image, wherein the panoramic video image is formed by at least two cuboid three-dimensional images;

extracting a moving target from at least two cuboid three-dimensional images;

performing image fusion processing on the panoramic video image and the moving target to form a panoramic video image incorporated with the moving target.

According to the above technical solution, for a panoramic video image generated by adopting a cuboid three-dimensional model, a moving target is extracted from a cuboid three-dimensional image adopted in generating the panoramic video image, and then the moving target is fused into the panoramic video image, thereby a problem of abnormal display of the moving target in the panoramic video image generated by adopting the cuboid three-dimensional model is solved and the completeness of the panoramic video image is ensured.

Optionally, extracting the moving target from the at least two cuboid three-dimensional images includes:

when it is detected that a moving target is displayed abnormally at a stitching area in the panoramic video image, the moving target is extracted from the at least two cuboid three-dimensional images.

By applying this technical solution, a moving target displayed abnormally can be specifically extracted, without additional processing on a normally displayed moving target, which improves the efficiency and accuracy of extraction and reduces the complexity of the extraction.

Optionally, extracting the moving target from the at least two cuboid three-dimensional images includes:

determining a target image from a cuboid three-dimensional image corresponding to a stitching area;

determining pixels corresponding to a moving foreground image in the target image;

identifying a contour of the moving target according to the determined pixels;

acquiring mask information of an image area corresponding to the contour of the moving target;

extracting the moving target according to the mask information.

By applying the above technical solution, the accuracy of the extracted moving target can be ensured.

Optionally, determining a target image from a cuboid three-dimensional image corresponding to a stitching area includes:

determining a cuboid three-dimensional image corresponding to the stitching area in which the moving target is located;

taking a ground image of the determined cuboid three-dimensional image as a target image.

According to the above technical solution, the completeness of the extracted moving target can be ensured.

Optionally, determining pixels corresponding to a moving foreground image in the target image includes:

performing Gaussian background modeling detection on each pixel in the selected target image by using a Gaussian background modeling algorithm to determine the pixels corresponding to the moving foreground image.

By applying the Gaussian background modeling algorithm, the selected target image can be detected in real time and stably, which improves the accuracy of acquiring the moving target.

Optionally, performing image fusion processing on the panoramic video image and the moving target includes:

inserting the moving target in a to-be-fused area of the panoramic video image;

determining color values of pixels in the to-be-fused area of the panoramic video image in which the moving target is inserted by using a Poisson fusion algorithm;

performing image reconstruction on the to-be-fused area according to the determined color values of the pixels.

By applying the above technical solution, it can be ensured that the moving target is better fused into the panoramic video image.

Optionally, determining color values of pixels in the to-be-fused area of the panoramic video image in which the moving target is inserted by using a Poisson fusion algorithm includes:

determining a divergence of a color value of the panoramic video image in which the moving target is inserted; and generating a sparse matrix according to a boundary constraint condition of the to-be-fused area of the panoramic video image;

constructing a following Poisson equation:

$$Ax=B \quad (1)$$

wherein, A is the sparse matrix, and B is the divergence of a color value of the panoramic video image inserted with the moving target, and x is the color value of a pixel to be solved;

solving the Poisson equation to determining the color values of the pixels in the to-be-fused area.

By applying this technical solution, it can be ensured that a natural seamless fusion effect is achieved between the fused area and other areas after the moving object is fused into the panoramic video image.

An apparatus for fusion of a panoramic video, includes:

an acquiring unit, configured for acquiring a panoramic video image, wherein the panoramic video image is formed by at least two cuboid three-dimensional images;

an extracting unit, configured for extracting a moving target from the at least two cuboid three-dimensional images;

a fusing unit, configured for performing image fusion processing on the panoramic video image and the moving target to form a panoramic video image incorporated with the moving target.

According to the above technical solution, for a panoramic video image generated by adopting a cuboid three-dimensional model, a moving target is extracted from a cuboid three-dimensional image adopted in generating the panoramic video image, and then the moving target is fused into the panoramic video image, thereby a problem of abnormal display of the moving target in the panoramic video image generated by adopting the cuboid three-dimensional model is solved and the completeness of the panoramic video image is ensured.

Optionally, the extracting unit, is specifically configured for:

extracting, when it is detected that a moving target is displayed abnormally at a stitching area in the panoramic video image, the moving target from a cuboid three-dimensional image corresponding to the stitching area.

By applying this solution, a moving target displayed abnormally can be specifically extracted, without additional processing on a normally displayed moving target, which improves the efficiency and accuracy of extraction and reduces the complexity of the extraction.

Optionally, the extracting unit, is specifically configured for:

determining a target image from a cuboid three-dimensional image corresponding to a stitching area;

determining pixels corresponding to a moving foreground image in the target image;

identifying a contour of the moving target according to the determined pixels;

acquiring mask information of an image area corresponding to the contour of the moving target;

extracting the moving target according to the mask information.

By applying the above technical solution, the accuracy of the extracted moving target can be ensured.

Optionally, when determining a target image from a cuboid three-dimensional image corresponding to a stitching area, the extracting unit is configured for:

determining a cuboid three-dimensional image corresponding to the stitching area in which the moving target is located;

taking a ground image of the determined cuboid three-dimensional image as a target image.

By applying the above technical solution, the completeness of the extracted moving target can be ensured.

Optionally, when determining pixels corresponding to a moving foreground image in the target image, the extracted unit is configured for:

performing Gaussian background modeling detection on each pixel in the selected target image by using a Gaussian background modeling algorithm to determine the pixels corresponding to the moving foreground image.

By applying the Gaussian background modeling algorithm, the selected target image can be detected in real time and stably, which improves the accuracy of acquiring the moving target.

Optionally, the fusing unit, is specifically configured for:

inserting the moving target in a to-be-fused area of the panoramic video image;

determining color values of pixels in the to-be-fused area of the panoramic video image in which the moving target is inserted by using a Poisson fusion algorithm;

performing image reconstruction on the to-be-fused area according to the determined color values of the pixels.

By applying the above technical solution, it can be ensured that the moving target is better fused into the panoramic video image.

Optionally, the fusing unit, when determining color values of pixels in the to-be-fused area of the panoramic video image in which the moving target is inserted by using a Poisson fusion algorithm, is specifically configured for:

determining a divergence of a color value of the panoramic video image in which the moving target is inserted; and generating a sparse matrix according to a boundary constraint condition of the to-be-fused area of the panoramic video image;

constructing a following Poisson equation:

$$Ax=B \quad (1)$$

wherein, A is the sparse matrix, and B is the divergence of a color value of the panoramic video image inserted with the moving target, and x is the color value of a pixel to be solved;

solving the Poisson equation to determine the color values of the pixels in the to-be-fused area.

By applying this technical solution, it can be ensured that a natural seamless fusion effect is achieved between the fused area and other areas after the moving object is fused into the panoramic video image.

An embodiment of the present application further provides an electronic device suitable for fusion of a panoramic video, the electronic device includes a processor and a memory, wherein the memory is configured for storing executable code, and the processor is configured for performing the following steps by reading the executable code stored in the memory:

acquiring a panoramic video image, wherein the panoramic video image is formed by at least two cuboid three-dimensional images;

extracting a moving target from the at least two cuboid three-dimensional images;

performing image fusion processing on the panoramic video image and the moving target to form a panoramic video image incorporated with the moving target.

An embodiment of the present application further provides a storage medium, which is configured for storing executable code, and the executable code is configured for executing the method for fusion of a panoramic video according to any of the embodiments of this application when executed. The method for fusion of a panoramic video, includes:

acquiring a panoramic video image, wherein the panoramic video image is formed by stitching at least two cuboid three-dimensional images;

extracting a moving target from the at least two cuboid three-dimensional images;

performing image fusion processing on the panoramic video image and the moving target to form a panoramic video image incorporated with the moving target.

An embodiment of the present application further provides a system for fusion of a panoramic video, including at least two panoramic cameras and an image processor, wherein:

the at least two panoramic cameras are configured for respectively capturing a two-dimensional image of each local space in a preset scene;

the image processor is configured for determining, for each of the local spaces, a cuboid three-dimensional image of the local space according to the two-dimensional image of the local space and a cuboid three-dimensional model corresponding to the local space;

a panoramic video image is formed by stitching at least two cuboid three-dimensional images;

extracting a moving target from the at least two cuboid three-dimensional images;

performing image fusion processing on the panoramic video image and the moving target to form a panoramic video image incorporated with the moving target.

By applying the above technical solution, for a panoramic video image generated by adopting a cuboid three-dimensional model, a moving target is extracted from a cuboid three-dimensional image adopted in generating the panoramic video image, and then the moving target is fused into the panoramic video image, thereby a problem of abnormal display of the moving target in the panoramic video image generated by adopting the cuboid three-dimensional model is solved and the completeness of the panoramic video image is ensured.

BRIEF DESCRIPTION OF THE DRAWINGS

The drawings described herein are used to provide further understanding of the present application, and form a part of the present application. The exemplary embodiments and descriptions thereof are used to explain the present application and do not constitute improper limitations to the present application. In the drawings.

DETAILED DESCRIPTION

In order to make objectives, technical solutions and advantages of the present application more apparent, the present application will be described more clearly and completely with reference to the accompanying drawings and by way of specific embodiments. Obviously, the embodiments described are only some of the embodiments of the present application instead of all of them. All other embodiments obtained by those of ordinary skills in the art based on the embodiments herein without any creative efforts are within the scope of the present application.

The technical solutions provided by the embodiments of the present application are described in detail below with reference to the accompanying drawings.

Embodiment 1

It should be noted that the executive body of each step of the method provided in Embodiment 1 may all be the same device, or the method may also be performed by different devices. The device may be any device with image processing function, such as an electronic computer, an image processing device, and the like, and may also be a control device of a video monitoring system.

Figure 1:
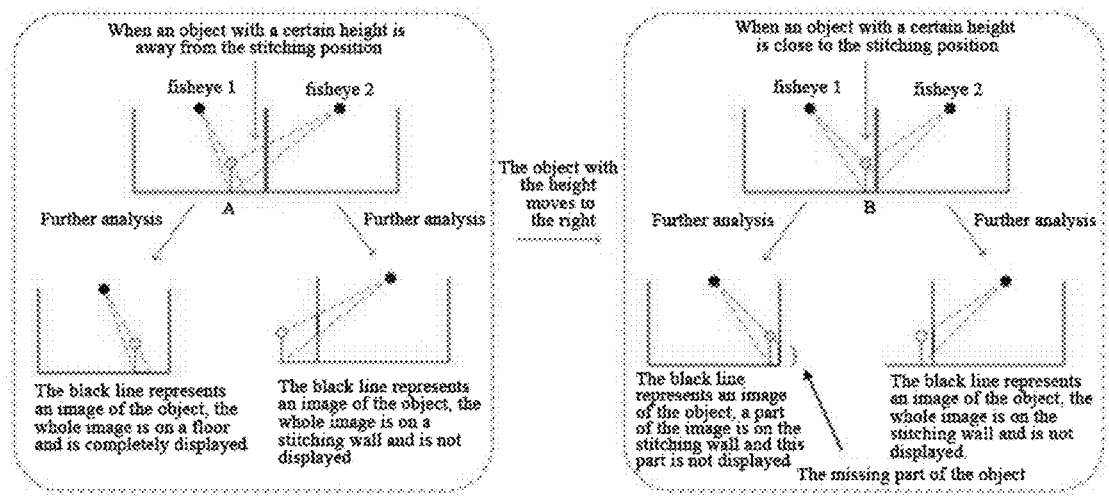
FIG. 1 is a schematic diagram illustrating abnormal display of a moving target in the related art.
Figure 2:
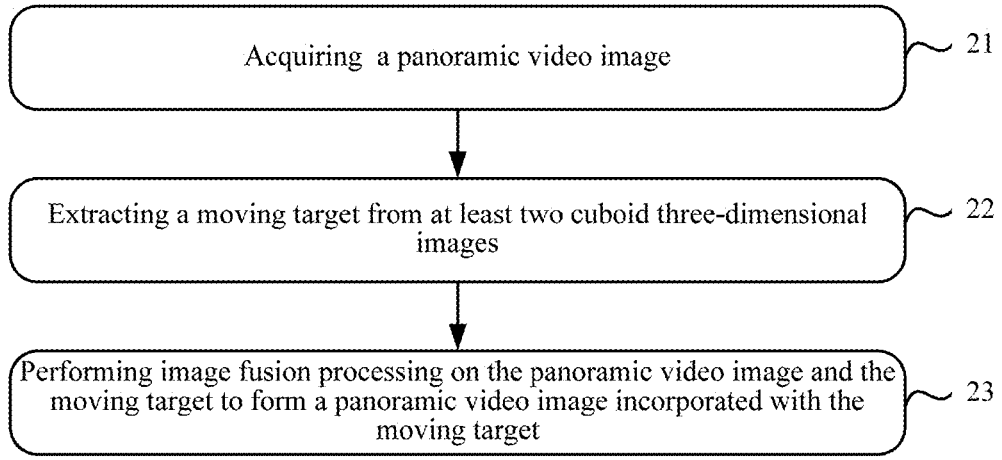
FIG. 2 is a schematic diagram illustrating steps of a method for fusion of a panoramic video according to Embodiment 1 of the present application.

FIG. 2 is a schematic diagram illustrating steps of a method for fusing panoramic video images provided by Embodiment 1 of the present application, the method mainly includes the following steps.

Step 21: acquiring a panoramic video image.

The panoramic video image involved in this step may be formed by stitching cuboid three-dimensional images respectively corresponding to at least two panoramic cameras at different positions in a preset scene. The panoramic camera may be a camera having a large angle of view and capable of shooting a specific space in a wide range without a blind angle, and may be, for example, a fisheye camera. For convenience of description, embodiments of the present application are described by taking a fisheye camera as an example, which does not constitute a limitation to the present application.

Figure 3:
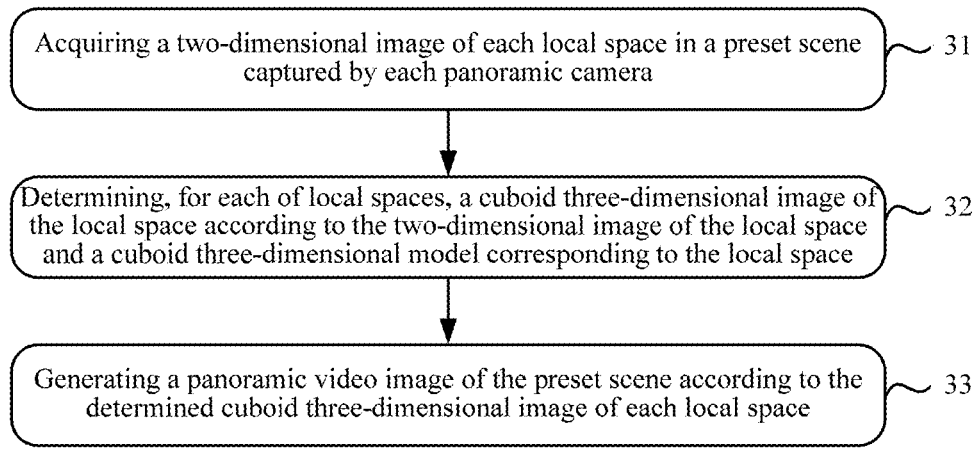
FIG. 3 is a schematic diagram illustrating steps of a method for generating a panoramic video image according to Embodiment 1 of the present application.

Specifically, a panoramic video image may be generated in the following manner, referring to a flow diagram of steps shown in FIG. 3.

Step 31: acquiring a two-dimensional image of each of local spaces in a preset scene captured by a panoramic camera.

In the embodiment of the present application, the preset scene may be irregular. For example, there may be a lot of walls and corners in the preset scene, so that the field of view of the preset scene is not wide, and a panorama of the preset scene cannot be captured by shooting at multiple angles or by a single panoramic camera.

Figure 4:
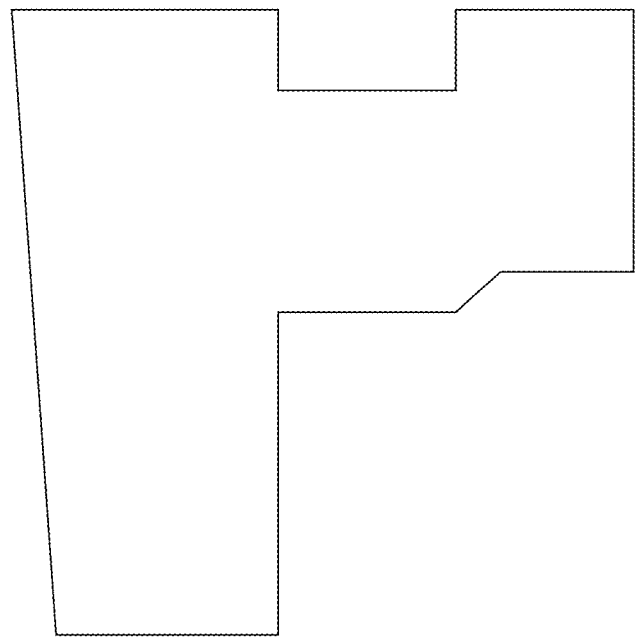
FIG. 4(a) is a plan top view of a preset scene with an irregular spatial structure according to Embodiment 1 of the present application.
FIG. 4(b) is a plan top view illustrating the preset scene shown in FIG. 4(a) after division according to Embodiment 1 of the present application.
FIG. 4(c) is a plan top view illustrating cuboid three-dimensional models corresponding to the local spaces in the preset scene shown in FIG. 4(b) according to Embodiment 1 of the present application.
FIG. 4(d) illustrates two-dimensional images of three local spaces captured respectively by three fisheye cameras shown in FIG. 4(c) according to the embodiment of the present application.
FIG. 4(e) is a schematic diagram of a projection model of a fisheye camera according to Embodiment 1 of the present application.
FIG. 4(f) illustrates effect diagrams of the generated cuboid three-dimensional images respectively corresponding to the two-dimensional images shown in FIG. 4(d) according to Embodiment 1 of the present application.
FIG. 4(g) is a three-dimensional effect diagram of the panoramic video image of the preset scene generated after stitching each of cuboid three-dimensional images according to Embodiment 1 of the present application.
Figure 4:
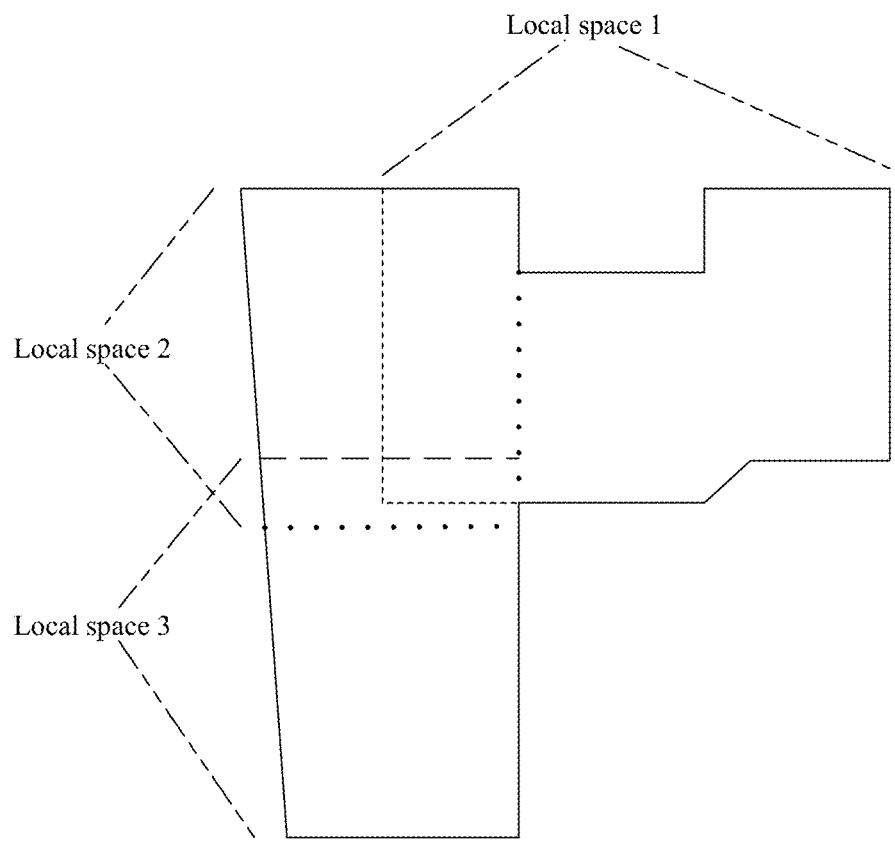
Figure 4:
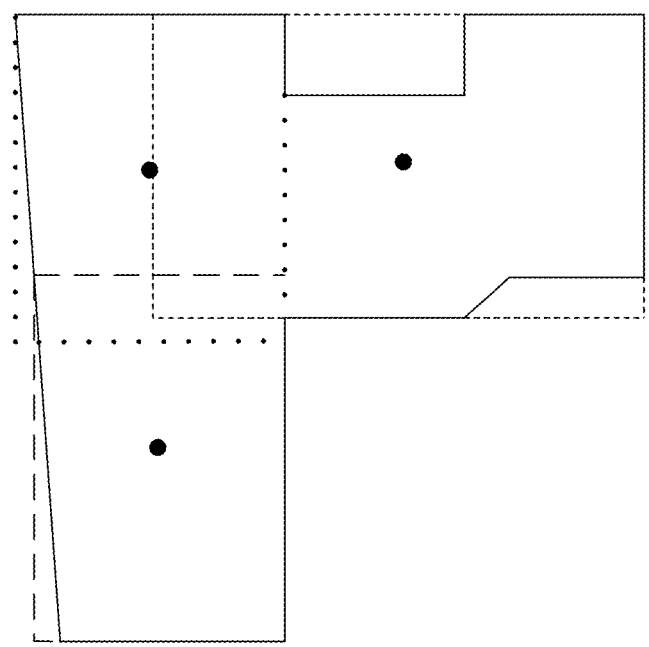
Figure 4:
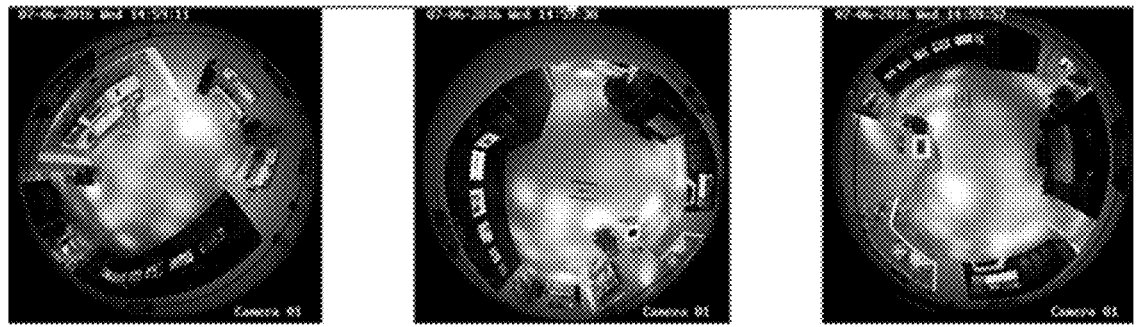
Figure 4:
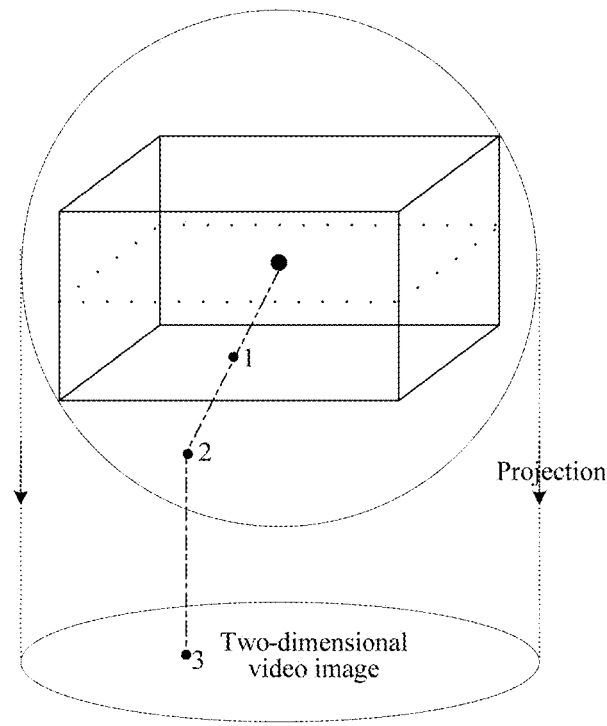
Figure 4:
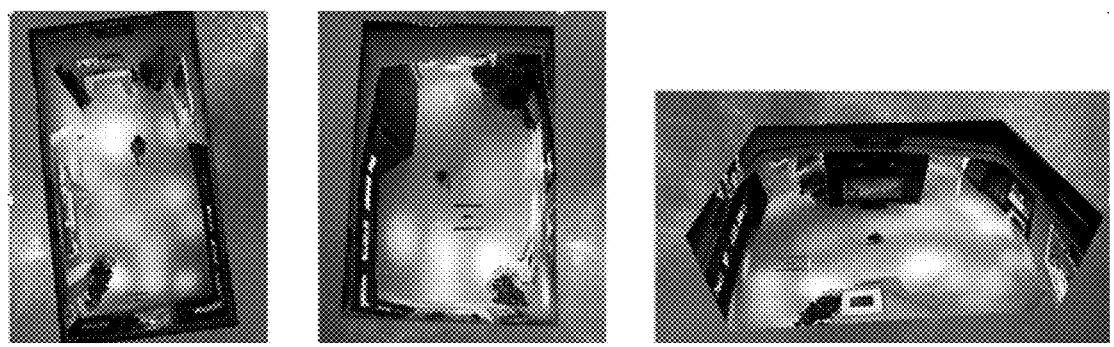
Figure 4:
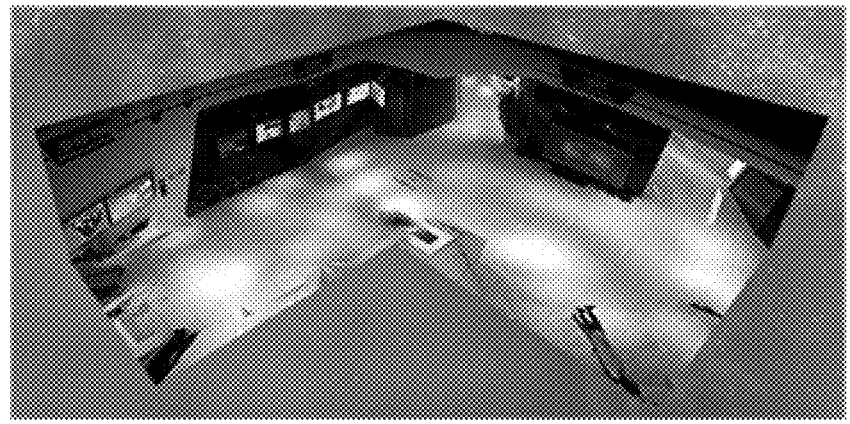

FIG. 4(a) is a plan top view of a preset scene with an irregular spatial structure provided by Embodiment 1 of the present application. Boundaries of the preset scene are irregular, and there are a lot of walls and corners that block the field of view, and the preset scene is generally "L" shaped.

Before performing Step 31, some preparatory work may be completed by a staff in advance, including measuring size parameters in the preset scene, dividing the local spaces in the preset scene, installing a single fisheye camera in each of the local spaces, and establishing a preset cuboid three-dimensional model of each of local spaces. Alternatively, the above preparation work may also be implemented based on machine vision and intelligent algorithms according to a preset measurement rule, division rule, and model establishment rule.

Taking the preset scene shown in FIG. 4(a) as an example, the preset scene is divided into several local spaces in advance according to the spatial structure of the preset scene. A standard of the division is that, the field of view of each of local spaces is wide and not larger than the visible range of the fisheye camera, to ensure that the shooting range of the single fisheye camera installed in the local space has no dead angle. Based on this standard, there are many ways to divide the local spaces, which is not limited in this application. It should be emphasized that there may be an overlapping portion between the divided local spaces, or there may be no overlapping portion. FIG. 4(b) is a plan top view illustrating the preset scene shown in FIG. 4(a) after division according to the present application. As shown in FIG. 4(b), the preset scene is divided into three local spaces, local space 1 to local space 3 are respectively defined by different dividing lines, wherein, the local space 1 corresponds to a short dashed dividing line, the local space 2 corresponds to a dot-dashed dividing line, the local space 3 corresponds to a long dashed dividing line, and there is an overlapping portion between the three local spaces.

After dividing the local spaces, a preset cuboid three-dimensional model corresponding to each of local spaces is respectively determined according to the structure of each of local spaces. A central position of the upper surface of each of the preset cuboid three-dimensional models may be a position of a fisheye camera installed in the corresponding local space, and the preset cuboid three-dimensional model may be a cuboid capable of completely surrounding the corresponding local space, in particular may be a smallest circumscribed cuboid corresponding to the local space. FIG. 4(c) is a plan top view illustrating cuboid three-dimensional models corresponding to the local spaces in the preset scene shown in FIG. 4(b) according to Embodiment 1 of the present application. As shown in FIG. 4(c), a large black dot represents a fisheye camera, and boundaries of three preset cuboid three-dimensional models are respectively represented by different lines, and the correspondence is the same as shown in FIG. 4(b).

As another implementation, a center of a middle section of each of preset cuboid three-dimensional models in the horizontal direction may be a position of a fisheye camera installed in the corresponding local space, and the preset cuboid three-dimensional model may be a cuboid capable of completely surrounding the corresponding local space. The preset cuboid three-dimensional model corresponds to a projection model shown in FIG. 4(e).

In the embodiment of the present application, an original two-dimensional image of each of local spaces captured by the corresponding fisheye camera is a circular two-dimensional plane image. FIG. 4(d) illustrates two-dimensional images of three local spaces captured respectively by three fisheye cameras shown in FIG. 4(c) according to the embodiment of the present application.

Step 32: determining, for each of the local spaces, a cuboid three-dimensional image of the local space according to a two-dimensional image of the local space and a cuboid three-dimensional model corresponding to the local space.

In the embodiment of the present application, a projected pixel corresponding to a pixel of a specific number of pixels in the two-dimensional image of the local space is determined by projecting each of the specific number of pixels on the cuboid three-dimensional model corresponding to the local space; and then the cuboid three-dimensional image of the local space is determined according to each of the determined projected pixels.

In the embodiment of the present application, the specific number of pixels may be all pixels in the two-dimensional image, and may also be a part of pixels in the two-dimensional image. Specifically, the part of pixels in the two-dimensional image of the local space may be part pixels extracted in a certain interval according to an arrangement order of the pixels. There are many ways of extracting part of the pixels, as long as a two-dimensional image with low-resolution composed of the extracted partial pixels can retain the main information of the two-dimensional image to a certain extent.

Based on a projection principle of the fisheye camera, the visible area of the fisheye camera may be regarded as a hemispherical surface, and the captured two-dimensional image is regarded as a plane image obtained by projecting the hemispherical surface directly below itself. FIG. 4(e) is a schematic diagram of a projection model of a fisheye camera provided by the embodiment of the present application. As shown in FIG. 4(e), a center of a circumscribed sphere of the cuboid three-dimensional model corresponding to the local space may be considered as a position at which the fisheye camera is installed; a middle section of the preset cuboid three-dimensional model that is in the horizontal direction and includes the center of the sphere may be considered as the upper surface of the local space; a lower half part of the preset cuboid three-dimensional model may be considered as the local space; and the lower half part of the circumscribed spherical surface may be considered as the visible area of the fisheye camera. The visible area of the fisheye camera projects directly below itself to obtain a plane image, that is the original two-dimensional image, wherein, point 1 is a projected pixel on the lower surface of the preset cuboid two-dimensional model of the local space, point 2 is a pixel projected on the spherical surface corresponding to point 1, and point 3 is an original pixel obtained by projecting point 2 on the plane in the vertical direction.

Specifically, the embodiment of the present application provides a method for determining a projected pixel corresponding to a pixel projected on a cuboid three-dimensional model corresponding to a local space according to each pixel in a two-dimensional image of the local space. The method includes, determining an circumscribed spherical surface of the cuboid three-dimensional model corresponding to the local space, wherein a radius of the circumscribed spherical surface is not greater than a visual distance of the panoramic camera, and the two-dimensional image of the local space is located directly below the cuboid three-dimensional model corresponding to the local space; determining, for each pixel in the two-dimensional image of the local space, a projection of the pixel on the circumscribed spherical surface in a direction perpendicular to the plane of the two-dimensional image as a spherical surface pixel; determining a line connecting the center of the circumscribed spherical surface and the spherical surface pixel; taking an intersection point between the connecting line and a surface of the cuboid three-dimensional model corresponding to the local space as a projected pixel corresponding to the pixel on the cuboid three-dimensional model corresponding to the local space; taking a pixel value (i.e. color value) of the pixel as a pixel value of the projected pixel corresponding to the pixel.

In the embodiment of the present application, after determining a projected pixel corresponding to each pixel projected on the cuboid three-dimensional model corresponding to the local space, the cuboid three-dimensional model corresponding to the local space is colored, and the colored cuboid three-dimensional model of the local space is taken as a cuboid three-dimensional image of the local space. FIG. 4(f) illustrates effect diagrams of the generated cuboid three-dimensional images respectively corresponding to the two-dimensional images shown in FIG. 4(d) according to the embodiment of the present application.

Step 33: generating a panoramic video image of the preset scene according to the determined cuboid three-dimensional image of each local space.

In the embodiment of the present application, cuboid three-dimensional images may be arranged according to a relative position of preset cuboid three-dimensional models corresponding to local spaces respectively, and then geometric adjustment is performed at a stitching position between the cuboid three-dimensional images until adjacent cuboid three-dimensional images are completely connected and matched with each other, and then the panoramic video image of the preset scene is obtained. FIG. 4(g) is a three-dimensional effect diagram of the panoramic video image of the preset scene generated after stitching each of cuboid three-dimensional images according to the embodiment of the present application.

In the embodiment of the present application, for the executive body of step 21, a method of obtaining panoramic video images may include, but not limited to, the following two manners.

Manner 1: receiving a panoramic video image generated by other devices according to the above steps 31-33.

Manner 2: generating a panoramic video image by itself according to the above steps 31-33.

However, regardless of the manner in which the panoramic video image is acquired, for the determined panoramic video image, since only the stitching processing is performed on the cuboid three-dimensional model, there is a problem that the panoramic video image is incomplete in the related art.

In order to solve the problem that a moving target is abnormally displayed at the stitching area in the above stitching solution, the moving target may be extracted from at least two cuboid three-dimensional images involved, and then the moving target is fused into the generated panoramic video image to ensure the integrity of the panoramic video image.

The stitching area may be determined after generating the panoramic video image. Specifically, a boundary of the stitching area is a stitching position, and the other boundary is a preset base line. For any of the cuboid three-dimensional images, the stitching position in the cuboid three-dimensional image may be determined after generating the panoramic video image. Meanwhile, the position of the preset base line is determined according to a height of the moving target and a capture angle of a fisheye camera. Thereby the stitching area is determined.

Step 22: extracting a moving target from the at least two cuboid three-dimensional images.

Specifically, in the step 22, all moving targets may be extracted from the cuboid three-dimensional images that are stitched to form the panoramic video image, and then fusion processing is performed on the moving target by an image fusion method.

Optionally, in order to avoid complexity of performing an extraction operation on all the moving targets, a moving target may be extracted from at least two cuboid three-dimensional images when it is detected that the moving target displays abnormally at the stitching area in the panoramic video image. Thereby a moving target displayed abnormally may be extracted, without additional processing on a normally displayed moving target, which improves efficiency and accuracy of extraction on one hand and reduces the complexity of the extraction on the other hand.

The moving target is displayed abnormally in the stitching area, which may refer to a situation in which the moving target disappears in whole or in part at the stitching area, or an abnormal display such as a ghost is appear.

Specifically, in the present application, the determined panoramic video image may be compared with all cuboid three-dimensional images used in stitching by means of an image comparison manner. If the two do not match, it is determined that a moving target is displayed abnormally in the panoramic video image, and thereby the moving target may be extracted from a corresponding cuboid three-dimensional image.

Figure 5:
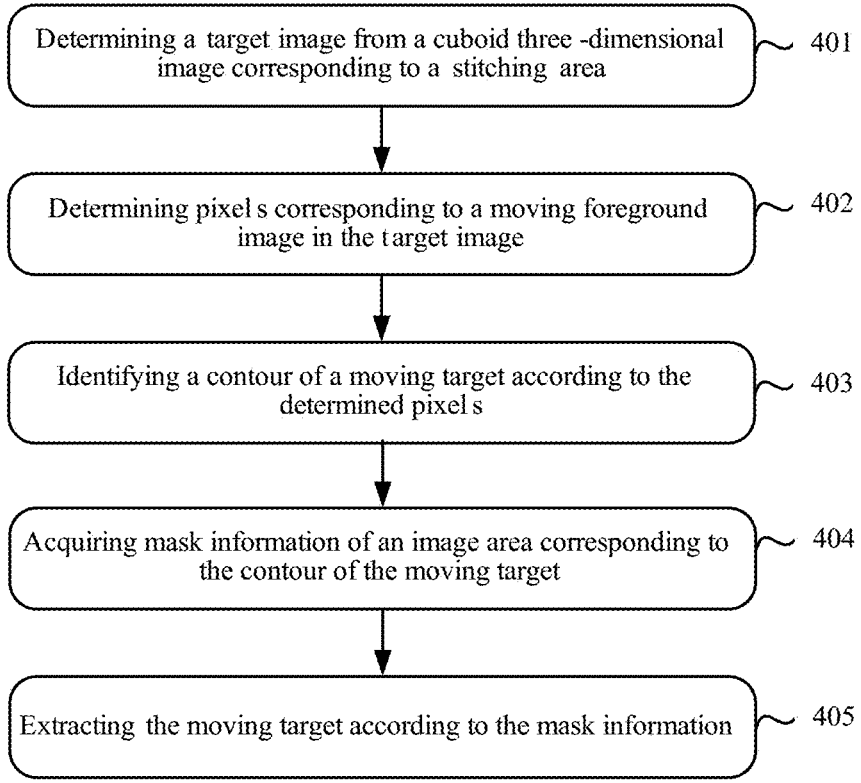
FIG. 5 is a schematic diagram illustrating steps of a method for extracting a moving target from a cuboid three-dimensional image according to Embodiment 1 of the present application.

Furthermore, referring to FIG. 5, extracting a moving target from a cuboid three-dimensional image may be specifically implemented by the following steps.

Step 401: determining a target image from a cuboid three-dimensional image corresponding to a stitching area.

In order to ensure the integrity and the accuracy of an extracted moving target, a target image used for extracting the moving target may be determined in advance, that is, not only to ensure that the moving target is completely included in the target image, but also to ensure that the extracted moving target is located in the stitching area, so as to avoid extra extraction of other moving target. Therefore, the step 401 may be specifically implemented by the following steps.

In step 1, determining a cuboid three-dimensional image corresponding to the stitching area in which the moving target is located.

In this step, in order to reduce a processing complexity and to avoid the extraction of the moving object for all cuboid three-dimensional images, this step defines a processing object as a cuboid three-dimensional image corresponding to the stitching area in which the moving target is located, thereby ensuring the accuracy of the extraction of the moving target.

In step 2, taking a ground image of the determined cuboid three-dimensional image as a target image.

In this application, it is considered that the preset scene is mainly an indoor scene. Therefore, when there is a moving target, people or animals walking on the ground are usually taken as moving targets. At this time, the ground image in the cuboid three-dimensional image may be taken as a target image. In addition to the moving target walking on the ground, if a flying moving target is also considered, for example an airplane model flying in an indoor scene, then a whole cuboid three-dimensional image may be taken as the target image.

Step 402: determining pixels corresponding to a moving foreground image in the target image.

In this step 402, there are many ways to determine the moving foreground, such as frame difference, moving competition, background subtraction and so on, so as to accurately identify the moving foreground. The present application uses Gaussian background modeling algorithm to extract the moving foreground.

Firstly, the Gaussian background modeling algorithm is introduced. The algorithm mainly converts the moving target detection problem in the background image (i.e., the target image in this application) into a two-classification problem based on a background estimation of the currently determined background image. All pixels belonging to the background image are classified into two types: fixed background and moving foreground, and then a classification result is processed to obtain a final detection result.

In the following, detecting the moving foreground by using the Gaussian background modeling algorithm in the present application is described below. Step 402 may be specifically implemented as:

performing Gaussian background modeling detection on each pixel in the selected target image by using a Gaussian background modeling algorithm to determine pixels corresponding to the moving foreground image.

In a process of establishing a Gaussian background model, a color value of a pixel in the selected target image is taken as a random function P, assuming that a probability of occurrence of the color value of the pixel obeys a Gaussian distribution, and I(x,y,t) represents a color value of a pixel (x,y) at time t, a probability density function for any pixel (x,y) may be obtained according to the Gaussian background modeling algorithm.

$$P(I) = \frac{1}{\sqrt{2\pi}\,\sigma_t} e^{\frac{(x-u_t)^2}{2\sigma_t^2}} \quad (2)$$

wherein, $u_t$ and $\sigma_t$ are expected value and standard deviation of the Gaussian distribution of the pixel (x,y) at time t, respectively, and P(I) represents the color value of the pixel.

Specifically, for the color value I(x,y,t) at time t, the moving foreground image and the fixed background image may be detected according to the following formula (3):

$$I(x, y, t) = \begin{cases} 0, & |I(x, y, t) - u_{t-1}(x, y)| < \lambda * \sigma_{t-1}(x, y) \\ 1, & |I(x, y, t) - u_{t-1}(x, y)| \geq \lambda * \sigma_{t-1}(x, y) \end{cases} \quad (3)$$

When $|I(x,y,t) - u_{t-1}(x,y)| < \lambda * \sigma_{t-1}(x,y)$, the color value I(x,y,t) is 0, indicating that the detected pixels are pixels of the fixed background image; when $|I(x,y,t) - u_{t-1}(x,y)| \geq \lambda * \sigma_{t-1}(x,y)$, the color value I(x,y,t) is 1, indicating that the detected pixels are pixels of the moving foreground image, wherein $u_{t-1}$ and $\sigma_{t-1}$ are expected value and standard deviation of the Gaussian distribution of the pixel (x,y) at time t−1, respectively.

Therefore, pixels corresponding to the desired moving foreground image may be determined in the above manner. Moreover, when detecting the moving foreground and fixed background of the target image by using the Gaussian background modeling algorithm, since time is considered in the process of background estimation, the Gaussian background modeling algorithm has high real-time performance and stability, which can improve the accuracy of the detection.

Step 403: identifying a contour of the moving target according to the determined pixels.

Figure 6:
FIG. 6 is a schematic diagram illustrating identifying a contour of a moving target according to the determined pixels according to Embodiment 1 of the present application.

After determining the pixels corresponding to the moving foreground image, the contour of the moving target may be identified from the target image according to the pixels. The so-called moving target, in the embodiment of the present application, is actually a moving object in the preset scene, including: walking or running people, animals, and the like, as well as moving non-organisms such as a chair, an airplane, and the like. Referring to FIG. 6, assuming that a moving target in the target image is a walking person, pixels of the moving foreground are determined according to the Gaussian background modeling algorithm described above, and then the contour of the person is identified by using the pixels to ensure the integrity of the moving target acquired subsequently.

Step 404: acquiring mask information of an image area corresponding to the contour of the moving target.

Since the Gaussian background modeling algorithm is only a background estimation, a contour including a moving target identified from the pixels is not necessarily the contour of the desired moving target. Therefore, it is necessary to acquire mask information of an image area corresponding to the contour of the determined moving target. The mask information may be information of a binary image set artificially, and refers to two possible values or gray level states of each of pixels on the image, and people often use black and white (B&W), and monochrome images to represent a binary image. Since the Gaussian background modeling algorithm is used in the present application, the mask information of the moving target may be represented based on the above determined binary value of 0 or 1.

Step 405: extracting the moving target according to the mask information.

Specifically, the desired moving target may be extracted according to the mask information of the image area corresponding to the contour of the moving target. For example, if a mask value of the moving target is 1, pixels corresponding to the mask value 1 are extracted from the mask information and taken as the moving target. In fact, in the specific extraction process, information of a pixel such as a position of the pixel and a color value of the pixel is also used.

Step 23: performing image fusion processing on the panoramic video image and the moving target, to form a panoramic video image incorporated with the moving target.

Specifically, the extracted moving target is fused into a corresponding position in the panoramic video image, and the actual preset scene may be completely presented, and an abnormal display of the moving target at the stitching position and in the vicinity of the stitching position is avoided, and the accuracy and completeness of the panoramic video image are improved.

According to the technical solution of the present application, for a panoramic video image generated by adopting a cuboid three-dimensional model, a moving target located at a stitching area is extracted from cuboid three-dimensional images used for generating the panoramic video image, and then the moving target is fused into the panoramic video image, thereby a problem of abnormal display of the moving target at the stitching position and in the vicinity of the stitching position in the panoramic video image generated by adopting the cuboid three-dimensional model is solved and the completeness of the panoramic video image is ensured. In particular, in Embodiment 1, the Gaussian background modeling algorithm is used and it can detect the selected target image in real time and stably, which improves the accuracy of acquiring the moving target.

Embodiment 2

Figure 7:
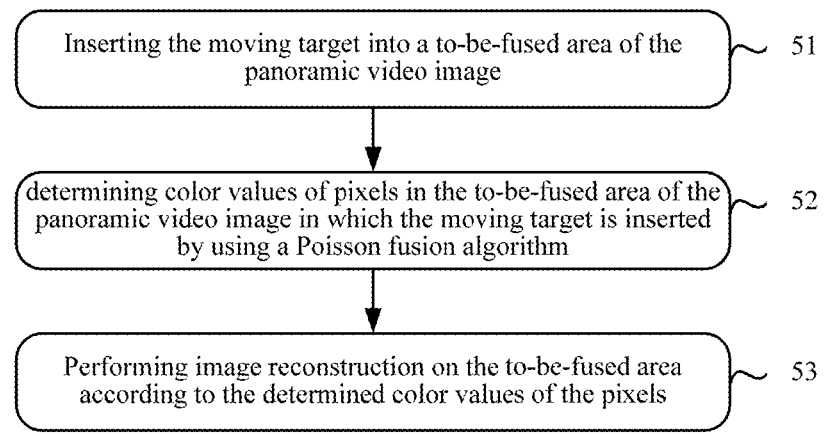
FIG. 7 is a schematic diagram illustrating steps of a Poisson fusion method according to Embodiment 2 of the present application.

Based on the method for fusion of a panoramic video according to Embodiment 1, when the extracted moving target is fused into the panoramic video image, an uneven gray level fusion may occur at a boundary of a to-be-fused area between the moving target and the panoramic video image. In order to solve the problem, Embodiment 2 of the present application provides a method for performing image fusion processing on a panoramic video image and a moving target. FIG. 7 is a schematic diagram illustrating steps of a Poisson fusion method according to Embodiment 2 of the present application, the method mainly includes:

Step 51: inserting the moving target in a to-be-fused area of the panoramic video image.

Specifically, the moving target extracted using the method according to Embodiment 1 is inserted into the to-be-fused area of the panoramic video image by using an interpolation algorithm, so that the moving target is present at the to-be-fused area.

Step 52: determining color values of pixels in the to-be-fused area of the panoramic video image in which the moving target is inserted by using a Poisson fusion algorithm.

In this step 52, a divergence of a color value of the panoramic video image in which the moving target is inserted is determined; and a sparse matrix is generated according to a boundary constraint condition of the to-be-fused area of the panoramic video image. It should be noted that the calculation of the divergence and sparse matrix may be carried out simultaneously or sequentially. Then, a following Poisson equation is constructed by using the calculated divergence and sparse matrix:

$$Ax=B \quad (1)$$

wherein, A is the sparse matrix, and B is the divergence of a color value of the panoramic video image inserted with the moving target, and x is the color value of a pixel to be solved.

The color value of the pixel in the to-be-fused area is determined by solving the above Poisson equation.

The divergence of the color value of the panoramic video image inserted with the moving target and the sparse matrix involved in this step may be obtained by the following manners.

The divergence of the color value of the panoramic video image inserted with the moving target is determined by: calculating a gradient field of a video image corresponding to the moving target, calculating a gradient field of a panoramic video image displayed abnormally at the stitching position, and calculating a gradient field of the panoramic video image inserted with the moving target, and then calculating a partial derivative of the gradient of the panoramic video image inserted with the moving target to determine the divergence of the panoramic video image inserted with the moving target.

The sparse matrix is determined by: determining a divergence of each pixel in the to-be-fused area, wherein the divergence of a pixel at the boundary is obtained by the boundary constraint condition, and the divergence of a pixel outside of the boundary is obtained by summing color values of four pixels, i.e. top, bottom, left, and right pixels of the above pixel, and then the sum subtracting four times of the color value of the pixel to obtain the divergence thereof.

Step 53: performing image reconstruction on the to-be-fused area according to the determined color values of the pixels.

After determining a color value corresponding to each pixel in the to-be-fused area, each pixel in the to-be-fused area is processed, and image reconstruction is performed on the to-be-fused area, that is, the color value of each of pixels in the to-be-fused area is replaced by a determined color value of a corresponding pixel to achieve the image reconstruction.

By applying the above fusion method, the moving target in the stitching area of the panoramic video image is complete, and the color values of the pixels at the boundary are relatively continuous, thereby realizing natural seamless fusion, improving the fusion effect, and ensuring the quality of the panoramic video image.

According to the technical solution of the present application, for a panoramic video image generated by adopting a cuboid three-dimensional model, a moving target located at a stitching area is extracted from a cuboid three-dimensional image, and then the moving target is fused into the panoramic video image, thereby a problem of abnormal display of the moving target at the stitching position and in the vicinity of the stitching position in the panoramic video image generated by adopting the cuboid three-dimensional model is solved, in particular, the problem of abnormal display of the moving target is solved, and the completeness of the panoramic video image is ensured. In particular, the Poisson fusion algorithm is used to fuse the moving target. Since the Poisson fusion algorithm fully considers a color divergence of the image area corresponding to the moving target, and uses the boundary condition as a limit, so that the color value of each pixel in the to-be-fused area can be seamlessly matched with those of pixels in the area outside the to-be-fused area in the panoramic video image, thereby ensuring that the color values of the pixels at the boundary between the image of reconstructed fused area and areas outside of the fused area in the panoramic video image are continuous, realizing seamless fusion, improving the fusion effect and ensuring the quality of the panoramic video image.

Embodiment 3

Figure 8:
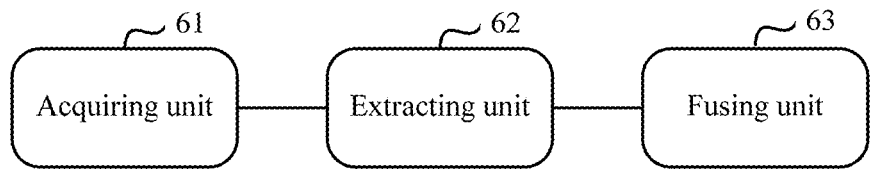
FIG. 8 is a schematic structural diagram of an apparatus for fusion of a panoramic video according to Embodiment 3 of the present application.

With the same inventive concept of the above Embodiment 1 and Embodiment 2, the present application also provides an apparatus for fusion of a panoramic video. As shown in FIG. 8, the apparatus mainly includes the following functional units:

an acquiring unit 61, configured for acquiring a panoramic video image, wherein the panoramic video image is formed by stitching at least two cuboid three-dimensional images;

an extracting unit 62, configured for extracting a moving target from the at least two cuboid three-dimensional images;

a fusing unit 63, configured for performing image fusion processing on the panoramic video image and the moving target, to form a panoramic video image incorporated with the moving target.

In an optional implementation, in order to reduce the complexity of extracting a moving target and improve the accuracy of the extracting operation, the extracting unit is specifically configured for extracting a moving target from a cuboid three-dimensional image corresponding to the stitching area when it is detected that the moving target is displayed abnormally at the stitching area in the panoramic video image.

In an optional implementation, in order to ensure the accuracy of the extracted moving target, the extracting unit, when extracting the moving target from the at least two cuboid three-dimensional images, is specifically configured for determining a target image from the cuboid three-dimensional image corresponding to the stitching area, determining pixels corresponding to a moving foreground image in the target image, identifying a contour of the moving target according to the determined pixels, acquiring mask information of an image area corresponding to the contour of the moving target, and extracting the moving target according to the mask information.

In an optional implementation, in order to ensure the completeness of the extracted moving object, the extracting unit, when determining the target image from the cuboid three-dimensional image, is specifically configured for determining a cuboid three-dimensional image corresponding to the stitching area in which the moving target is located, and taking the ground image of the determined cuboid three-dimensional image as the target image.

In an optional implementation, in order to ensure the accuracy of the determined pixels corresponding to the moving foreground image, the extracting unit, when determining the pixels corresponding to the moving foreground image in the target image, is specifically configured for performing Gaussian background modeling detection on each of pixels in the selected target image by using a Gaussian background modeling algorithm, and determining the pixels corresponding to the moving foreground image.

In an optional implementation, in order to ensure that the moving object can be better fused into the panoramic video image, the fusing unit may be specifically configured for inserting the moving target into a to-be-fused area of the panoramic video image, determining color values of pixels in the to-be-fused area of the panoramic video image infused with the moving target by using a Poisson fusion algorithm, and performing image reconstruction on the to-be-fused area according to the determined color values of the pixels.

In an optional implementation, in order to ensure the natural seamless fusion effect between the fused area and other areas after fusing the moving target into the panoramic video image, the fusing unit, when determining the color value of the pixels in the fused area of the panoramic video image inserted with the moving target by using the Poisson fusion algorithm, is specifically configured for determining a divergence of a color value of the panoramic video image inserted with the moving target, and generating a sparse matrix according to the boundary constraint condition of the to-be-fused area of the panoramic video image; and the following Poisson equation is constructed:

$$Ax=B \quad (1)$$

wherein, A is the sparse matrix, and B is the divergence of a color value of the panoramic video image inserted with the moving target, and x is the color value of a pixel to be solved; the Poisson equation is solved to determine the color values of the pixels in the to-be-fused area.

According to the above technical solution, performing the method of the Embodiment 1 or Embodiment 2 by using the apparatus for fusion of a panoramic video can effectively solve the problem that the moving target disappears at the stitching position or in the vicinity of the stitching position in the panoramic video image generated by using the cuboid three-dimensional model. On the one hand, by means of the Gaussian background modeling algorithm, the selected target image can be detected in real time and stably, which improves the accuracy of acquiring the moving target, thereby ensuring the completeness of the panoramic video image. On the other hand, the Poisson fusion algorithm is used to fuse the moving target, so that the determined color value of each pixel in the fused area can be seamlessly matched with those of the pixels in the area outside the fused area in the panoramic video image, thereby ensuring that the color values of the pixels at the boundary between the image of reconstructed fused area and areas outside of the fused area in the panoramic video image are continuous, realizing natural seamless fusion, improving the fusion effect and ensuring the quality of the panoramic video image.

An embodiment of the present application further provides an electronic device suitable for fusion of a panoramic video, the electronic device includes a processor and a memory, wherein the memory is configured for storing executable code, and the processor is configured for performing the following steps by reading the executable code stored in the memory:

acquiring a panoramic video image, wherein the panoramic video image is formed by stitching at least two cuboid three-dimensional images;

extracting a moving target from the at least two cuboid three-dimensional images;

performing image fusion processing on the panoramic video image and the moving target to form a panoramic video image incorporated with the moving target.

The electronic device exists in various forms, including but not limited to:

(1) Mobile communication device: this type of device is characterized by its mobile communication function and is mainly aimed at providing voice and data communication. Such terminals include: smart phones (such as an iPhone), multimedia phones, functional phones, and low-end phones and the like.

(2) Ultra-mobile personal computer equipment: this type of equipment belongs to the category of personal computers, which has computing and processing functions, and generally has a mobile Internet access feature. Such terminals include: PDAs, MIDs, and UMPC devices and the like, such as an iPad.

(3) Portable entertainment device: this type of device may display and play multimedia contents. Such type of device includes: audio, video players (such as an iPod), handheld game players, e-books, smart toys and portable onboard navigation equipment.

(4) Server: a device that provides computing services, the server comprises a processor, a hard disk, a memory, a system bus, etc. The architecture of the server is similar to that of a common computer, but since it is necessary to provide highly reliable services, the server has higher requirements in terms of processing ability, stability, reliability, security, scalability, and manageability.

(5) Other electronic devices with data interaction functions.

In the above technical solution, for a panoramic video image generated by adopting a cuboid three-dimensional model, a moving target is extracted from a cuboid three-dimensional image adopted in generating the panoramic video image, and then the moving target is fused into the panoramic video image, thereby a problem of abnormal display of the moving target in the panoramic video image generated by adopting the cuboid three-dimensional model is solved and the completeness of the panoramic video image is ensured.

An embodiment of the present application further provides a storage medium, which is configured for storing executable code, and the executable code is configured for executing the method for fusion of a panoramic video according to any of the embodiments of this application when executed. Specifically, the method for fusion of a panoramic video includes:

acquiring a panoramic video image, wherein the panoramic video image is formed by stitching at least two cuboid three-dimensional images;

extracting a moving target from the at least two cuboid three-dimensional images;

performing image fusion processing on the panoramic video image and the moving target, to form a panoramic video image incorporated with the moving target.

In the above technical solution, for a panoramic video image generated by adopting a cuboid three-dimensional model, a moving target is extracted from a cuboid three-dimensional image adopted in generating the panoramic video image, and then the moving target is fused into the panoramic video image, thereby a problem of abnormal display of the moving target in the panoramic video image generated by adopting the cuboid three-dimensional model is solved and the completeness of the panoramic video image is ensured.

An embodiment of the present application further provide a system for fusion of a panoramic video, including at least two panoramic cameras and an image processor, wherein:

the at least two panoramic cameras are configured for respectively capturing a two-dimensional image of each local space in a preset scene;

the image processor is configured for determining, for each of the local spaces, a cuboid three-dimensional image of the local space according to the two-dimensional image of the local space and a cuboid three-dimensional model corresponding to the local space;

a panoramic video image is formed by stitching at least two cuboid three-dimensional images;

a moving target is extracted from the at least two cuboid three-dimensional images;

image fusion processing is performed on the panoramic video image and the moving target to form a panoramic video image incorporated with the moving target.

Those skilled in the art will appreciate that embodiments of the present application may be provided as a method, system, or computer program product. Thus, the present application may take the form of an entirely hardware embodiment, an entirely software embodiment or an embodiment in combination of software and hardware. Moreover, the present application may take the form of a computer program product implemented in one or more computer-usable storage media (including but not limited to a disk storage, CD-ROM, optical storage, etc.) including computer usable program code.

The present application is described with reference to flow diagrams and/or block diagrams of methods, devices (systems) and computer program products according to embodiments of the present application. It should be understood that each flow and/or block in a flow diagram and/or block diagram, as well as a combination of the flows and/or blocks in the flow diagram and/or block diagram, may be implemented by computer program instructions. These computer program instructions may be provided to processors of general purpose computers, special purpose computers, embedded processors or other programmable data processing devices to generate a machine, so that an apparatus for implementing a function specified in one or more flows of the flow diagram and/or one or more blocks of the block diagram is generated by instructions executed by a computer or a processor of other programmable data processing device.

These computer instructions may also be stored in a computer readable memory which can guide a computer or other programmable data processing device to work in a specific way, so that instructions stored in the computer readable memory can generate a manufacture including an instruction apparatus that implements a function specified in one or more flows of the flow diagram and/or one or more blocks of the block diagram.

These computer instructions may also be loaded onto a computer or other programmable data processing device, so that a series of operational steps are performed on the computer or other programmable device to generate computer-implemented processing, thereby instructions executed on a computer or other programmable device provide a step for implementing a function specified in one or more flows of the flow diagram and/or one or more blocks of the block diagram.

In one typical configuration, a computing device comprises one or more processors (CPU), input/output interfaces, network interfaces and a memory.

The memory may include a volatile memory, random access memory (RAM), and/or non-volatile memory in a computer readable medium, such as a read-only memory (ROM) or flash random access memory (flash RAM). Memory is an example of a computer readable medium.

Computer readable media include permanent and non-permanent, removable and non-removable media that can achieve information storage by any method or technology. The information may be computer readable instructions, data structures, modules of programs, or other data. The examples of the computer storage media includes, but not limited to, phase change random access memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read only memory (CD-ROM), digital versatile disk (DVD) or other optical storages, magnetic cassette tape, magnetic tape disk storage or other magnetic storage devices or any other non-transmittable media that can be configured to store the information that can be accessed by a computing device. As defined herein, the computer readable media does not include transitory media, such as modulated data signals and carrier waves.

Moreover, the terms "include", "comprise" or any other variants thereof are intended to cover non-exclusive inclusions, so that processes, methods, articles or devices including a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

The described above are merely embodiments of the present application, and not intended to limit the present application. Various modifications and changes can be made to the present application by those skilled in the art. Any modifications, equivalents, improvements or the like within the spirit and principle of the present application should be included in the scope of the present application.

What is claimed is:

1. A method for fusion of a panoramic video, comprising:
acquiring a panoramic video image, wherein the panoramic video image is formed by stitching at least two cuboid three-dimensional images;
extracting a moving target in a target image from a cuboid three-dimensional image corresponding to a stitching area in the at least two cuboid three-dimensional images when it is detected that the moving target is displayed abnormally at a stitching area in the panoramic video image, by comparing the panoramic video image with the at least two cuboid three-dimensional images;
performing image fusion processing on the panoramic video image and the moving tar-get at the stitching area to form a panoramic video image incorporated with the moving target;

wherein, performing image fusion processing on the panoramic video image and the moving target comprises:
inserting the moving target into a to-be-fused area of the panoramic video image;
determining color values of pixels in the to-be-fused area of the panoramic video image in which the moving target is inserted by using a Poisson fusion algorithm;
performing image reconstruction on the to-be-fused area according to the determined color values of the pixels;
wherein, determining color values of pixels in the to-be-fused area of the panoramic video image in which the moving target is inserted by using a Poisson fusion algorithm comprises:
determining a divergence of a color value of the panoramic video image in which the moving target is inserted; and
generating a sparse matrix according to a boundary constraint condition of the to-be-fused area of the panoramic video image;
constructing a following Poisson equation:

$$Ax=B \quad (1)$$

wherein, A is the sparse matrix, and B is the divergence of a color value of the panoramic video image inserted with the moving target, and x is the color value of a pixel to be solved;
solving the Poisson equation to determine the color values of the pixels in the to-be-fused area.

2. The method of claim 1, wherein, extracting a moving target from the at least two cuboid three-dimensional images comprises:
determining a target image from a cuboid three-dimensional image corresponding to a stitching area;
determining pixels corresponding to a moving foreground image in the target image;
identifying a contour of the moving target according to the determined pixels;
acquiring mask information of an image area corresponding to the contour of the moving target;
extracting the moving target according to the mask information.

3. The method of claim 2, wherein, determining a target image from the cuboid three-dimensional image corresponding to the stitching area comprises:
determining a cuboid three-dimensional image corresponding to the stitching area in which the moving target is located;
taking a ground image of the determined cuboid three-dimensional image as a target image, wherein the ground image is an image only of ground on which a moving target is walking.

4. The method of claim 2, wherein, determining pixels corresponding to the moving foreground image in the target image comprises:
performing Gaussian background modeling detection on each pixel in the selected target image by using a Gaussian background modeling algorithm to determine the pixels corresponding to the moving foreground image.

5. An apparatus for fusion of a panoramic video, comprising:
an acquiring unit, configured for acquiring a panoramic video image, wherein the panoramic video image is formed by at least two cuboid three-dimensional images;

an extracting unit, configured for extracting a moving target from the at least two cuboid three-dimensional images;
a fusing unit, configured for performing image fusion processing on the panoramic video image and the moving target at the stitching area to form a panoramic video image incorporated with the moving target;
wherein the extracting unit is configured for:
extracting a moving target in a target image from a cuboid three-dimensional image corresponding to a stitching area when it is detected that the moving target is displayed abnormally at a stitching area in the panoramic video image, by comparing the panoramic video image with the at least two cuboid three-dimensional images;
wherein the fusing unit is configured for:
inserting the moving target into a to-be-fused area of the panoramic video image;
determining color values of pixels in the to-be-fused area of the panoramic video image in which the moving target is inserted by using a Poisson fusion algorithm;
performing image reconstruction on the to-be-fused area according to the determined color values of the pixels;
wherein, the fusing unit, when determining color values of pixels in the to-be-fused area of the panoramic video image in which the moving target is inserted by using a Poisson fusion algorithm, is configured for:
determining a divergence of a color value of the panoramic video image in which the moving target is inserted; and
generating a sparse matrix according to a boundary constraint condition of the to-be-fused area of the panoramic video image;
constructing a following Poisson equation:

$$Ax=B \qquad (1)$$

wherein, A is the sparse matrix, and B is the divergence of a color value of the panoramic video image inserted with the moving target, and x is the color value of a pixel to be solved;
solving the Poisson equation to determine the color values of the pixels in the to-be-fused area.

6. The apparatus of claim 5, wherein the extracting unit is configured for:
determining a target image from a cuboid three-dimensional image corresponding to a stitching area;
determining pixels corresponding to a moving foreground image in the target image;
identifying a contour of the moving target according to the determined pixels;
acquiring mask information of an image area corresponding to the contour of the moving target;
extracting the moving target according to the mask information.

7. The apparatus of claim 6, wherein, the extracting unit, when determining a target image from the cuboid three-dimensional image corresponding to the stitching area, is configured for:
determining a cuboid three-dimensional image corresponding to the stitching area in which the moving target is located;
taking a ground image of the determined cuboid three-dimensional image as a target image, wherein the ground image is an image only of ground on which a moving target is walking.

8. The apparatus of claim 6, wherein, the extracting unit, when determining pixels corresponding to the moving foreground image in the target image, is configured for:
performing Gaussian background modeling detection on each pixel in the selected target image by using a Gaussian background modeling algorithm to determine the pixels corresponding to the moving foreground image.

9. An electronic device, comprising a processor and a memory, wherein the memory is configured for storing executable code, and the processor is configured for performing the method of claim 1 by reading the executable code stored in the memory.

10. A non-transitory storage medium, which is configured for storing executable code, wherein the executable code is configured to perform the method for fusion of a panoramic video according to claim 1 when executed.

11. A system for fusion of a panoramic video, comprising at least two panoramic cameras and an image processor, wherein:
the at least two panoramic cameras are configured for respectively capturing a two-dimensional image of each local space in a preset scene;
the image processor is configured for determining, for each of the local spaces, a cuboid three-dimensional image of the local space according to the two-dimensional image of the local space and a cuboid three-dimensional model corresponding to the local space;
a panoramic video image is formed by stitching at least two cuboid three-dimensional images;
extracting a moving target in a target image from a cuboid three-dimensional image corresponding to a stitching area in the at least two cuboid three-dimensional images when it is detected that the moving target is displayed abnormally at a stitching area in the panoramic video image, by comparing the panoramic video image with the at least two cuboid three-dimensional images;
performing image fusion processing on the panoramic video image and the moving target at the stitching area to form a panoramic video image incorporated with the moving target;
wherein, performing image fusion processing on the panoramic video image and the moving target comprises:
inserting the moving target into a to-be-fused area of the panoramic video image;
determining color values of pixels in the to-be-fused area of the panoramic video image in which the moving target is inserted by using a Poisson fusion algorithm;
performing image reconstruction on the to-be-fused area according to the determined color values of the pixels;
wherein, determining color values of pixels in the to-be-fused area of the panoramic video image in which the moving target is inserted by using a Poisson fusion algorithm comprises:
determining a divergence of a color value of the panoramic video image in which the moving target is inserted; and
generating a sparse matrix according to a boundary constraint condition of the to-be-fused area of the panoramic video image;
constructing a following Poisson equation:

$$Ax=B \qquad (1)$$

wherein, A is the sparse matrix, and B is the divergence of a color value of the panoramic video image inserted with the moving target, and x is the color value of a pixel to be solved;

solving the Poisson equation to determine the color values of the pixels in the to-be-fused area.

* * * * *